INVENTOR.
RALPH V. LAUREL
BY
Frederick C. Lange
ATTORNEY

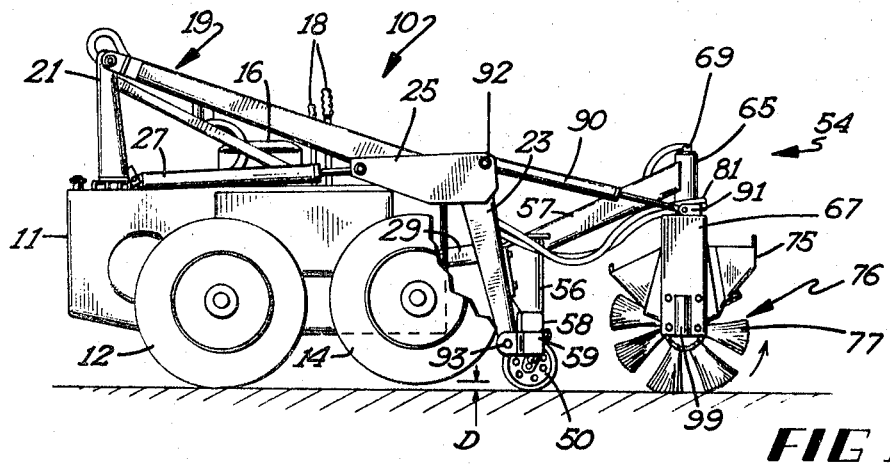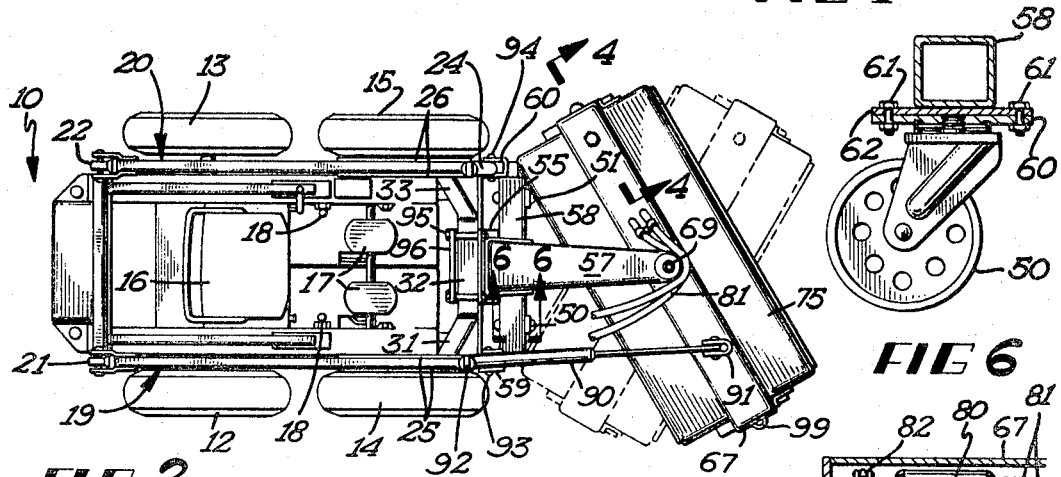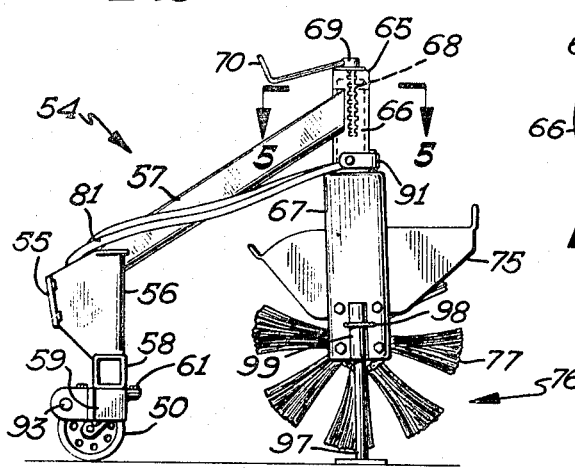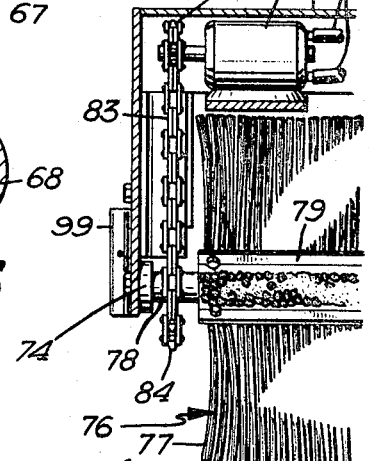
INVENTOR.
RALPH V. LAUREL
BY Frederick E. Savage
ATTORNEY

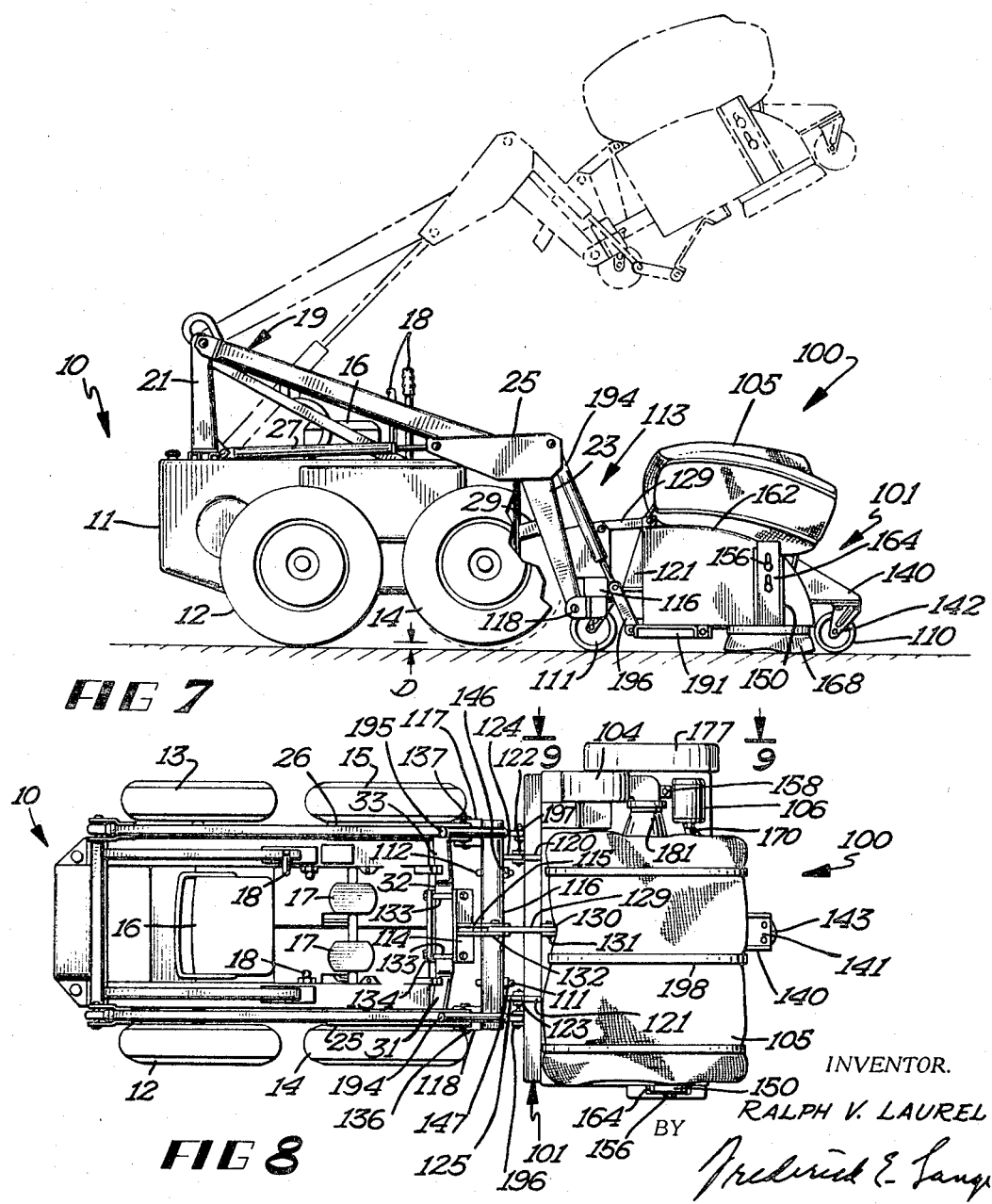

United States Patent Office 3,444,583
Patented May 20, 1969

3,444,583
VEHICLE WITH LIFT-OFF MEANS FOR EASE OF STEERING
Ralph V. Laurel, Minneapolis, Minn., assignor, by mesne assignments, to Melroe Manufacturing Company, Gwinner, N. Dak., a corporation of North Dakota
Filed Apr. 20, 1967, Ser. No. 632,313
Int. Cl. E01h *1/08, 1/05*
U.S. Cl. 15—340                                    11 Claims

ABSTRACT OF THE DISCLOSURE

This invention relates to a lift-off means used in steering a vehicle of the type having a front and rear pair of support-surface-engaging driven wheels, and means for varying the relative speed of rotation of the wheels on the right side of the vehicle with respect to those on the left side, to thereby steer or skid the vehicle through a change of direction. The invention is operative when the vehicle is being used to propel or move an implemental attachment such as a sweeper broom and consists of a castered support-surface-engaging means mounted to the vehicle for lifting one pair of the driven wheels off of the support surface, to thereby facilitate steering of the vehicle through the differential rate of rotation of the pair of driven wheels remaining in engagement with the support surface.

BACKGROUND OF THE INVENTION

The invention pertains to the field of art represented by vehicles of the type which have at least four driven wheels, each having a fixed axis of rotation, in which steering of the vehicle is accomplished by differential rates of rotation of the wheels on one side with respect to those on the other side. More particularly, it pertains to the field described above wherein the vehicle is used to propel an implemental attachment such as a sweeper broom.

There are a number of vehicles in the prior art in which steering is accomplished by a differential rate of rotation of wheels or tracks on one side of the vehicle with respect to those on the other side. In addition to tracked vehicles, wheeled vehicles have been provided in which a front and rear pair of driven wheels propel the vehicle and steering is accomplished through a differential in the rate of rotation of the wheels on the right side of the vehicle with respect to those on the left. An example of such a vehicle is provided by U.S. Patent No. 3,231,117 entitled "Tractor Vehicle and Drive Therefor" filed on Oct. 23, 1962, and issued on Jan. 25, 1966.

While the differential rate of rotation of the wheels on one side of the vehicle with respect to those on the other side provides a reasonable smooth means of steering the vehicle on a loose surface such as sand, gravel or snow, on a hard surface the steering is not satisfactory. Rubber-wheel mounted vehicles steered by differential rates of rotation of the wheels create difficulty when steering is attempted on a hard surface such as concrete or asphalt. On a hard surface the turning of the vehicle is erratic and often dangerous. The problem of steering the vehicle is particularly acute when it is being used to carry and operate an attachment such as a sweeper, fork lift, or other implement and some precision in steering is required.

The present invention eliminates the problem of steering a vehicle of the type described above, on a hard surface by providing two castered wheels operative adjacent the right and left front wheels of the vehicle. When the castered wheels are lowered into engagement with the supporting surface, the front wheels of the loader are lifted up off the supporting surface about three-fourths of an inch. With the two front wheels lifted slightly off the ground, steering without skidding may be readily accomplished through the differential rate of rotation of the two rear wheels. Accordingly, the vehicle may be easily steered on a hard surface and the problem of skidding and erratic steering is eliminated. When so steered, with the front wheels lifted off the ground, the ground engaging caster wheels pivot about a vertical axis as the rear wheels rotate at different speeds to thereby turn the vehicle without skidding.

SUMMARY OF THE INVENTION

The invention comprises a wheeled vehicle having a front and rear pair of support-surface engaging, driven wheels, each of the wheels having a fixed axis of rotation; means for varying the relative speed of rotation of the wheels on the right side of the vehicle in each of the pairs with respect to the wheels on the left side of the vehicle in each of the pairs, to thereby steer the vehicle; loader arm means moveably mounted to the vehicle; an implemental attachment mounted to the loader arm means; means for lowering and raising the loader arm means to thereby move the attachment into and out of working relationship with the support surface; and castered, support-surface-engaging means for lifting one pair of the driven wheels off the support surface when the attachment is lowered into working relationship with the support surface, to thereby facilitate steering of the vehicle.

Accordingly, when the above elements are provided, steering of the vehicle is accomplished without skidding. One pair of driven wheels remains in contact with the support surface and the other pair rotates ineffectively about three-fourths inch above the support surface. The castered support surface engaging means pivots about a vertical axis and as the direction of the vehicle is changed through a differential rate of rotation of the driven wheels which engage the support surface.

The invention has among its objects:

To provide means mounted to a vehicle of the type described above for facilitating steering of the vehicle;

To provide a castered support-surface-engaging means which may be lowered into support surface engagement to lift one pair of the driven wheels off the ground, to thereby facilitate steering a vehicle of the type described above; and To provide a castered support-surface-engaging means in association with a vehicle of the type described above for lifting one pair of driven wheels off the ground simultaneously with the lowering of an implemental attachment into working relationship with the support surface, to thereby facilitate steering of the vehicle.

DESCRIPTION OF THE DRAWINGS

Each of the above objects is fulfilled in the illustrated embodiment wherein:

FIGURE 1 is a side view of the invention and shows a vehicle with an angle broom attachment mounted thereto, and with the castered lift-off means in engagement with the support-surface to lift the front wheels of the vehicle off the support surface;

FIGURE 2 is a top view of the vehicle and angle broom attachment of FIGURE 1 and shows the angular adjustability of the attachment as well as the details of its mounting to the vehicle;

FIGURE 3 is a side view of the angle broom attachment;

FIGURE 4 is a partial sectional view taken on the line 4—4 of FIGURE 2 and shows the hydraulic motor for driving the angle broom as well as the broom mounting;

FIGURE 5 is a sectional view taken on the line 5—5 of FIGURE 3;

FIGURE 6 is a sectional view taken on the line 6—6 of FIGURE 2 and shows the caster wheel and its mounting to the angle broom attachment cross member;

FIGURE 7 is a side view of the vehicle shown in FIGURE 1 with a pick-up sweeper attachment associated therewith. In FIGURE 7 the raised position of the vehicle loader arms is shown in phantom;

FIGURE 8 is a top view of the vehicle and implemental attachment shown in FIGURE 7;

DESCRIPTION OF THE PREFERRED EMBODIMENT

Figure 9:
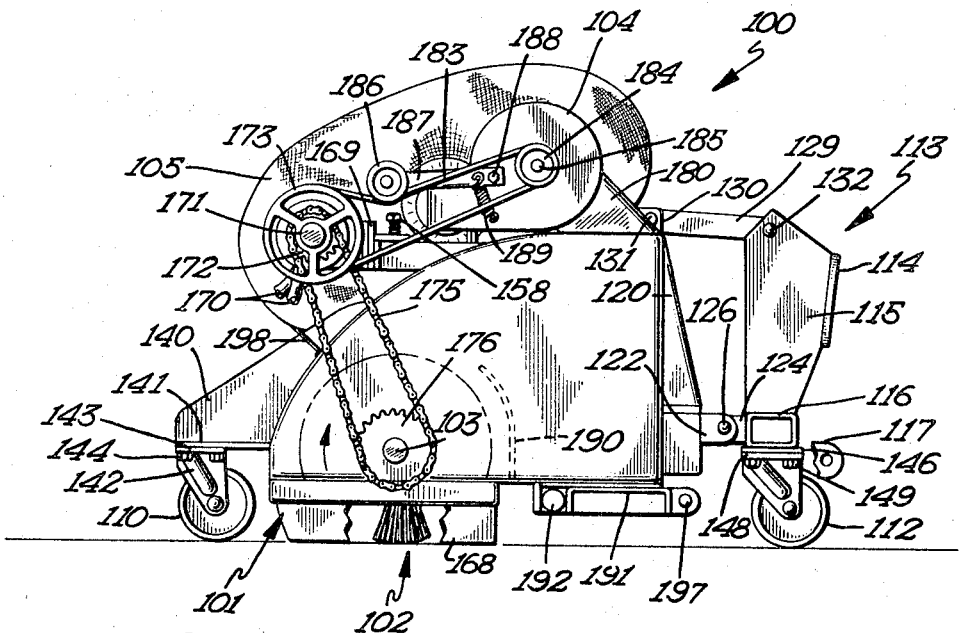
FIGURE 9 is an enlarged sectional view taken on the line 9—9 of FIGURE 8 and shows the hydraulic motor drive for the broom and the blower. The guard plate which covers the drive is removed.

The invention is shown in association with two implemental attachments: an angle broom (FIGURES 1-6) and a pick-up sweeper (FIGURES 7-10). It is also useful, however, in association with additional attachments such as a fork-lift attachment and a mower (not shown).

The invention is operative in association with a vehicle having a front and rear pair of support-surface-engaging driven wheels each of the wheels having a fixed axis of rotation, and means for varying the relative speed of rotation of the wheels on the right side of the vehicle in each of said pairs with respect to the wheels on the left side of the vehicle in each of said pairs to thereby steer the vehicle. Such a vehicle is shown in FIGURES 1, 2, 7 and 8. With reference particularly to FIGURES 2 and 7 the vehicle 10 includes a body 11 and four driven wheels 12, 13, 14 and 15. The driven wheels have a fixed axis of rotation. In other words, the wheels 12, 13, 14 and 15 cannot be steered in the normal sense which involves varying or changing the position of the wheel axis. Vehicle 10 includes a seat 16, foot pedals 17, hand levers 18, and a pair of loader arms 19 and 20. The loader arms 19 and 20 are pivotally mounted to a pair of stanchions 21 and 22 and extend forwardly and downwardly ajacent the side of the vehicle 10. The loader arms include a pair of downwardly extending members 23 and 24 which are joined with loader arms 19 and 20 by a fixed elbow reinforced by plate members 25 and 26. Loader arms 19 and 20 may be raised to the position shown in phantom in FIGURE 7 and lowered to the position shown in FIGURES 1 and 7 through the operation of hydraulic cylinders 27 and 28 which are pivotally mounted to the lower end of stanchions 21 and 22 and also pivotally mounted to the plate members 25 and 26, respectively.

The lowered position of loader arms 19 and 20 is defined by contact between the front of body 11 and stop members 29 which are mounted to the loader arm members 23 and 24, respectively, as best seen in FIGURE 1. Members 23 and 24 are connected by means of cross members 31, 32 and 33 which are welded to members 23 and 24 of loader arms 19 and 20, and extend between them. The intermediate cross member 32 provides a means for mounting implemental attachments to loader arms 19 and 20, as will be described more particularly below.

In operation, the vehicle shown and described is driven by each of the wheels 12, 13, 14 and 15. Since the wheels each have a fixed axis, steering is accomplished by varying the rate of rotation of wheels 13 and 15 with respect to wheels 12 and 14. For that purpose clutch means is provided and the differential rate of rotation is controlled by means of hand levers 18 which operate clutches disposed between the vehicle motor and the wheels. Thus wheels 13, 15 are driven at the same speed, either forward or reverse, and wheels 12 and 14 are also driven at the same speed, either forward or reverse. The speed at which wheels 12 and 14 are driven may be varied with respect to the speed of wheels 13 and 15. The differential rate of rotation provides a means for steering the vehicle.

Loader arms 19 and 20 of vehicle 10 may be raised and lowered as desired to thereby raise and lower implemental attachments fixed thereto. With the implemental attachments shown the loader arms 19 and 20 are in the lowered position defined by the engagement of stop members 29 with the front of body 11 during operation of the implement in working relationship with the support surface.

A pair of caster wheels 50 and 51 is mounted, in a manner to be described below, to the loader arms 19 and 20, respectively. When the loader arms are in the lowered position, that is, when stop members 29 engages the front of body 11, caster wheels 50 and 51 engage the support surface and lift the front wheels 14 and 15 of vehicle 10 off the ground about three-fourths of an inch. Thus, as shown in FIGURE 1, with caster wheels 50 and 51 in engagement wtih the support surface, front wheels 14 and 15 are raised above the support surface the distance, D. With loader arms 19 and 20 in the raised position and with caster wheels 50 and 51 lifted above the ground, front wheels 14 and 15 engage the supporting surface (as shown in phantom in FIGURE 7). With loader arms 19 and 20 lowered to thereby engage caster wheels 50 and 51 with the support surface, front wheels 14 and 15 are lifted off the ground about three-fourths of an inch.

The means for mounting caster wheels 50 and 51 to loader arms 19 and 20 and the relationship between the caster wheels and implemental attachments for vehicle 10, will be described in detail below, first in connection with the angle broom attachment shown in FIGURES 1-6.

With reference primarily to FIGURE 3, the angle broom 54 includes a mounting plate 55, a mounting plate bracket 56, a rigid arm 57 and a cross member 58. A pair of U-shaped mounting brackets 59 and 60 are welded to the ends of cross member 58. Caster wheels 50 and 51 are secured to cross member 58 as shown in FIGURE 6. Each of the caster wheels includes a lower plate 60 which is bolted, by means of bolts 61, to an upper plate 62. Upper plate 62 is welded to cross member 58 inwardly of U-shaped brackets 59 and 60.

As best seen in FIGURE 6, the rotatable broom portion of angle broom 54 is mounted to the rigid arm 57 through sleeve 65 and sleeve insert 66 which is securely fixed to broom yoke 67. Sleeve insert 66 is of circular cross-section and is slideable in sleeve 65 and threaded to threaded member 68. Threaded member 68 is rotatably fixed to collar 69 which is rotatable by means of crank 70. Thus as crank 70 is turned sleeve insert 66 rides up and down on threaded member 68 in sleeve 65 to thereby raise and lower broom yoke 67, independently of vertical movement of rigid member 57. While the angle broom attachment 54 remains in a fixed vertical position as far as caster wheels 50 and 51, as well as mounting bracket 56 and rigid member 57 are concerned, broom yoke 67 may be vertically adjusted to thereby adjust the elevation of the broom. A hood 75 is provided as a means for preventing dust and debris from being thrown upwardly.

Broom 76 consists of a plurality of rows of bristles 77 which are clamped to shaft 78 by means of clamping members 79. Thus worn bristles may be easily replaced. Broom shaft 78 is journaled in broom yoke 67 at bearings 74 as shown in FIGURE 4.

Broom 76 is rotated with shaft 78 by means of hydraulic motor 80. Hydraulic motor 80 is fed by lines 81 from vehicle 10 and includes a drive sprocket 82. Chain 83 connects drive sprocket 82 with broom sprocket 84 which is keyed to shaft 78. Thus hydraulic motor 80 drives broom 76 to provide a sweeping action.

Broom yoke 67 and broom 76 are angularly adjustable about a vertical axis, namely, about the axis of sleeve member 65, through the use of hydraulic cylinder 90. Hydraulic cylinder 90 is pivotally attached to broom yoke 67 at bracket 91 and is pivotally attached to elbow plate 25 at pin 92. Thus as hydraulic cylinder 90 is extended and retracted, broom 76 is angularly adjustable about a vertical axis as shown in FIGURE 2.

The angle broom is mounted to loader arms 19 and 20 of vehicle 10 at three points. U-shaped mounting brackets 59 and 60 are pinned to arms 23 and 24, respectively, at pins 93 and 94. Mounting plate 55 is securely mounted to intermediate cross member 32 through the use of four bolts 95 and backing plate 96. Rigid arm 57 is, accordingly, fixed with respect to loader arms 19 and 20 and moves up and down as loader arms 19 and 20 move up and down. Sleeve member 65 is also fixed with respect to loader arms 19 and 20. When loader arms 19 and 20 are in the fully lowered position with caster wheels 50 and 51 in engagement with the ground and with stop members 29 in engagement with the front of body 11 (see FIGURE 1), sleeve 65 is vertical. Thus as broom 76 is angularly adjusted about a vertical axis, bristles 77 and broom shaft 78 remain in a horizontal plane and the broom bristles 77 wear evenly during operation thereof.

When storage of the angle broom is desired, standards 97 are lowered into the position shown in FIGURE 3 with the pin 98 inserted into standard sleeve 99. Thus, bristles 77 are elevated and the weight of the frame is not supported by the bristles.

The pick-up sweeper attachment 100 is shown in FIGURES 7–10. In general the pick-up sweeper attachment 100 includes a frame and hood assembly 101, a rotatable broom 102, a broom shaft 103, a blower 104, a dust bag 105 and a hydraulic motor 106. The attachment also includes a front-running caster wheel 110 and a pair of lift-off caster wheels 111 and 112. The attachment is mounted to loader arms 19 and 20 of vehicle 10 through mounting assembly 113 best seen in FIGURES 7–9.

Mounting assembly 113 includes a mounting plate 114, mounting plate bracket 115, cross member 116 and, best seen in FIGURE 8, a pair of U-shaped mounting brackets 117 and 118 welded to cross member 116. A pair of triangular stiffening brackets 120 and 121 is welded to hood and frame assembly 101 and a pair of U-shaped mounting brackets 122 and 123 is secured respectively to hood brackets 120 and 121. Mounting brackets 122 and 123 are pinned to tabs 124 and 125 at pins 126 and 127, respectively, to thereby mount the attachment 100 to the mounting assembly 113 at two points. A link 129 extends from bracket 130 of hood and frame assembly 101 to mounting plate bracket 115. Link 129 is pinned to bracket 130 at pin 131 and to mounting plate bracket 115 at pin 132 to provide a third connection between the sweeper attachment and mounting assembly 113.

Pick-up sweeper attachment 100 is mounted to loader arms 19 and 20 of vehicle 10 through mounting assembly 113 in a manner similar to the mounting of angle broom 54. As best seen in FIGURE 8, mounting plate 114 is secured to intermediate cross member 32 through four mounting bolts 133 and backing plate 134. U-shaped mounting brackets 117 and 118 are pinned to members 23 and 24 at pins 136 and 137, respectively. Thus pick-up sweeper attachment 100 is fixed with respect to loader arms 19 and 20 and moves up and down as loader arms 19 and 20 move up and down.

As best seen in FIGURE 9, front running caster wheel 110 is mounted to frame and hood assembly 101 at bracket 140 and horizontal plate member 141. Front running caster wheel bracket 142 is mounted to horizontal plate member 141 through plate 143 and bolts 144.

With reference to FIGURES 8 and 9, lift-off caster wheels 111 and 112 are mounted to cross member 116 of mounting bracket assembly 113 through plates 146 and 147 which are welded to cross member 116. Caster wheels 111 and 112 are mounted to plates 146 and 147, respectively, through plates 148 and bolts 149, in a manner similar to the mounting of caster wheels 50 and 51 to cross member 58 as shown in FIGURE 6, in connection with angle broom 54.

As best seen in FIGURE 7, with loader arms 19 and 20 in the fully lowered position, defined by contact between loader arm stop members 29 with the front of body 11 of vehicle 10, the front wheels 14 and 15 of vehicle 10 are lifted off the support surface distance, D. Thus, with pick-up sweeper 100 lowered into working relationship with the support surface, front wheels 14 and 15 of vehicle 10 are lifted off the support surface by lift-off caster wheels 111 and 112, to thereby facilitate steering.

With the foregoing general description of the pick-up sweeper attachment 100 and its mounting to loader arms 19 and 20 of vehicle 10, the following detailed description of the pick-up sweeper may be readily understood.

Figure 10:
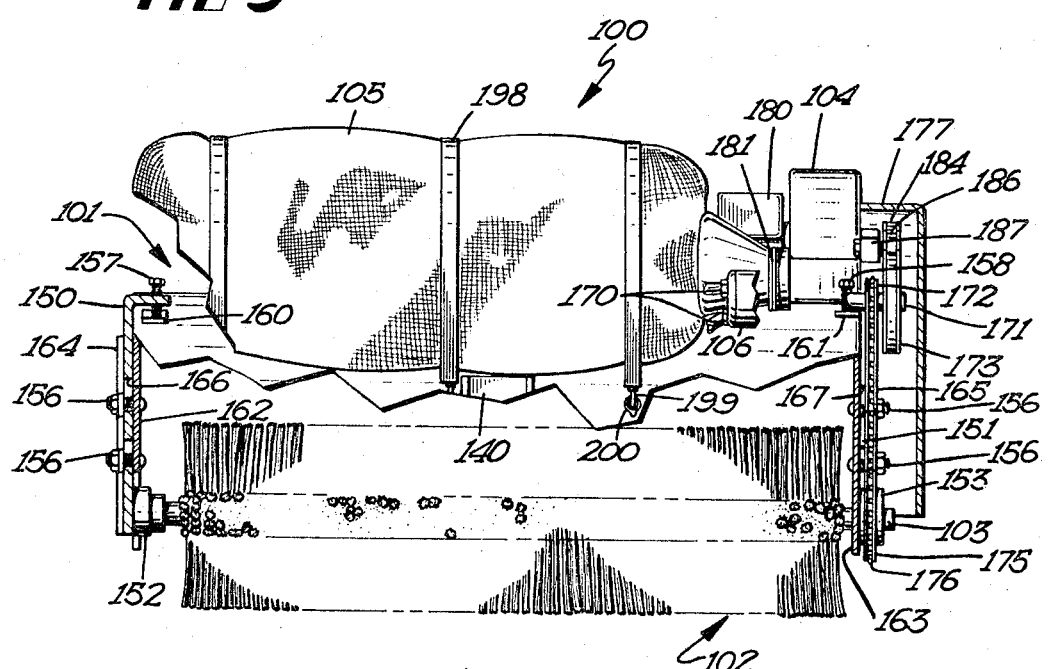
FIGURE 10 is a front view of the pick-up sweeper attachment with the front caster wheel removed and a portion of the sweeper hood broken away to show the broom mounting and chain drive.

As best seen in FIGURE 10, the sweeper broom 102 is mounted on shaft 103 to vertically adjustable members 150 and 151 at bearings 152 and 153. Rotatable broom 102, accordingly, may be vertically adjusted with respect to frame and hood assembly 101 by loosening nuts 156, best seen in FIGURE 10. With nuts 156 loosened, vertically adjustable members 150 and 151 may be raised or lowered by turning bolts 157 and 158 which are threaded to members 150 and 151, respectively. Bolts 157 and 158 abut shoulders 160 and 161, respectively, to thereby raise and lower vertical members 150 and 151 which are slideable with respect to side plates 162 and 163, as well as cover plates 164 and 165, through the provision of slots 166 and 167, respectively.

A flexible skirt 168 is suspended from frame and hood assembly 101 as best seen in FIGURES 7 and 9. Skirt 168 extends completely around the opening in frame and hood assembly which exposes broom 102.

The means for rotating broom 102 may be best understood with reference to FIGURES 9 and 10. Hydraulic motor 106 is mounted to plate 169 and fed by hydraulic line 170. Hydraulic motor 106 includes an output shaft 171. Drive sprocket 172 and pulley 173 are keyed to output shaft 171. Chain 175 extends from drive sprocket 172 to sprocket 176 which is keyed to broom shaft 103. Thus as drive sprocket 172 is rotated by hydraulic motor 106, chain 175, acting through sprocket 176, causes broom shaft 103 to rotate, and with it broom 102 rotates. The broom shaft drive means, as well as the blower drive means (described below) is covered by guard 177, best seen in FIGURE 10.

Blower 104 communicates with frame and hood assembly 101 at blower intake 180, best seen in FIGURE 9. The output of blower 104 is directed into dust bag 105 at collar 181. Thus dust which accumulates under hood 101 through the sweeping action of broom 102, enters intake 180, passes through blower 104, and is caught in dust bag 105.

Blower 104 is driven by hydraulic motor 106 through belt 183 which connects pulley 173 with blower pulley 184. The latter is keyed to blower drive shaft 185. Idler pulley 186 is rotatably mounted to arm 187 which is biased about pin 188 by spring 189. Idler pulley 186 engages belt 183 to provide a constant tension on the belt throughout vertical adjustment of broom 102. The belt tension adjustment is necessary because hydraulic motor 106, mounted to plate 169, is fixed with respect to vertically adjustable member 151. Thus as vertically adjustable member 151 is raised and lowered with respect to frame and hood assembly 101, hydraulic motor 106 is also raised and lowered. Since blower 104 is mounted to frame and hood assembly 101, there is relative movement between blower drive shaft 185 and hydraulic motor drive shaft 171 as broom 102 is vertically adjusted. It should be noted, however, that there is no relative movement between hydraulic motor drive shaft 171 and broom shaft 103 during such vertical adjustment of broom 102. The biased mounting of idler pulley 186, accordingly, compensates for the relative movement between hydraulic motor drive shaft 171, and blower drive shaft 185 during vertical adjustment of broom 102 with respect to frame and hood assembly 101.

Hopper 190 is provided to receive debris deposited therein by the rotation of broom 102. A hopper door 191 is hinged to frame and hood assembly 101 at pin 192 and provides a convenient means for emptying hopper 190. For that purpose, and as best seen in FIGURES 7 and 8, a pair of hydraulic cylinders 194 and 195 are pinned to plate members 25 and 26, at one end, and to links 196 and 197 at the other end, respectively. Links 196 and 197 are welded to cover 191. Thus as hydraulic cylinders 194 and 195 are extended and retracted, cover plate 191 pivots about pin 192 to open hopper 190 so that the contents thereof may be emptied. The operation of cover 191 is best seen with reference to FIGURE 7 where the open position is shown in phantom.

Dust bag 105 is strapped to frame and hood assembly 101 by means of straps 198 connected by means of hooks 199 which connect with rings 200 secured to frame and hood assembly 101, as best seen in FIGURE 10.

Hydraulic motors 80 and 106 require a throughput of ten gallons per minute and are rated at seven horsepower. Hydraulic motors 80 and 106 drive brooms 76, in the case of angle broom attachment 54; and broom 102, in the case of pick-up sweeper attachment 100, at a maximum speed of 400 r.p.m.

Brooms 76 and 102 may be provided with polypropylene bristles, although many other forms of bristles may also be used. In each case the bristles are clamped to the broom shaft so that they may be easily replaced when worn.

While other blowers may be used, a preferred form of blower 104 is one of the fan type, as distinguished from the squirrel-cage type, and has a speed of 3200–3400 r.p.m. and a volumetric output of about 650 c.f.m.

The overall operation of the present invention, in association with the attachments shown and described, contemplates lift-off of front wheels 14 and 15 of vehicle 10 when loader arms 19 and 20 are lowered by means of hydraulic cylinders 27 and 28, respectively, to thereby lower the implemental attachment into working relationship with the support surface. When the implemental attachment is so lowered, vehicle 10 may then be steered without skidding, to precisely maneuver the attachment and to eliminate any danger involved in erratic steering of the vehicle, since only two of the driven wheels, namely, rear wheels 12 and 13 remain in engagement with the support surface. As rear wheels 12 and 13 are driven at different rates of rotation, vehicle 10 is steered as front wheels 14 and 15 idle ineffectively above the support surface, and as the lift-off caster wheels pivot about a vertical axis.

Variations may be made in the illustrated embodiment without departing from the scope of the invention. More particularly, the present invention contemplates mounting an implemental attachment to either the front or the rear of the vehicle. With the placement of an implemental attachment at the rear of the vehicle, the rear wheels, rather than the front wheels, may be elevated from the support surface to eliminate skidding when turning. Moreover a variety of implemental attachments may be used with the present invention and, in addition to the two shown and described, a mower and a fork lift are specifically contemplated. Other implemental attachments may also be used. Those skilled in the art may also provide various means for actuating the implemental attachments, the hydraulic motor drive shown in association with the angle broom and pick-up sweeper being but an example of one suitable form of actuation.

I claim:
1. A wheeled vehicle comprising:
a front and rear pair of support-surface-engaging, driven wheels, each of said wheels having a fixed axis of rotation;
means for varying the relative speed of rotation of the wheels on the right side of said vehicle in each of said pairs with respect to the wheels on the left side of said vehicle in each of said pairs, to thereby steer said vehicle;
loader arm means movably mounted to said vehicle;
an implemental attachment mounted to said loader arm means;
castered, support-surface-engaging means mounted to said loader arms for lifting one pair of said driven wheels off said support surface when said attachment is lowered into working relationship with said support surface, to thereby facilitate steering of said vehicle; and
means for lowering and raising said loader arm means and said castered support-surface-engaging means to thereby move said attachment into and out of working relationship with said support surface.

2. The vehicle of claim 1 and stop means for limiting downward movement of said loader arm means to thereby define the lowered position of said castered, support-surface-engaging means and the lifted position of said one pair of said driven wheels.

3. The vehicle of claim 2 wherein said implemental attachment comprises means for sweeping said support surface.

4. The vehicle of claim 3 and means for vertically adjusting said sweeping means independently of said means for raising and lowering said loader arm, with said loader arms in said lowered position.

5. The vehicle of claim 4 wherein said sweeping means comprises a generally cylindrical broom rotatable about a horizontal axis transverse to the direction of travel of said vehicle, and means for rotating said broom.

6. The vehicle of claim 5 and means for angularly adjusting said axis of said rotatable broom with respect to the direction of travel of said vehicle.

7. The vehicle of claim 5 and receiving means disposed adjacent said rotatable broom for receiving particles swept thereby.

8. The vehicle of claim 7 and a hood covering said rotatable broom and said receiving means.

9. The vehicle of claim 8 and dust collecting means having an intake beneath said hood.

10. The vehicle of claim 9 wherein said dust collecting means comprises a blower mounted to said hood and communicating with said intake and means for collecting said dust.

11. The vehicle of claim 10 and means for emptying said receiving means.

References Cited
UNITED STATES PATENTS

| | | | |
|---|---|---|---|
| 2,711,551 | 6/1955 | Wagner et al. | 15—82 |
| 2,800,188 | 7/1957 | Garrett | 180—6.2 |
| 3,231,117 | 1/1966 | Melroe et al. | 214—778 |
| 3,337,890 | 8/1967 | Schmidt | 15—83 |

FOREIGN PATENTS 556,426  2/1957  Italy.

ROBERT W. MICHELL, *Primary Examiner.*

U.S. Cl. X.R.

15—83, 328, 349, 368; 180—6.2